(12) United States Patent
Li et al.

(10) Patent No.: US 10,208,806 B2
(45) Date of Patent: Feb. 19, 2019

(54) COMPLIANT SAFE JOINT AND MANUFACTURING METHOD THEREOF

(71) Applicant: The Chinese University of Hong Kong, Hong Kong (CN)

(72) Inventors: Peng Li, Hong Kong (CN); Zerui Wang, Hong Kong (CN); Yunhui Liu, Hong Kong (CN)

(73) Assignee: THE CHINESE UNIVERSITY OF HONG KONG, Hong Kong (CN)

( * ) Notice: Subject to any disclaimer, the term of this patent is extended or adjusted under 35 U.S.C. 154(b) by 370 days.

(21) Appl. No.: 15/089,156

(22) Filed: Apr. 1, 2016

(65) Prior Publication Data

US 2016/0298696 A1 Oct. 13, 2016

Related U.S. Application Data (60) Provisional application No. 62/145,162, filed on Apr. 9, 2015.

(51) Int. Cl.
| | |
|---|---|
| *F16D 7/04* | (2006.01) |
| *B21D 39/03* | (2006.01) |
| *F16D 7/00* | (2006.01) |
| *B25J 19/06* | (2006.01) |
| *B25J 17/02* | (2006.01) |

(52) U.S. Cl.
CPC .......... *F16D 7/005* (2013.01); *B25J 17/0225* (2013.01); *B25J 19/063* (2013.01); *Y10T 29/49826* (2015.01); *Y10T 464/20* (2015.01)

(58) Field of Classification Search
CPC ....... F16D 7/005; B25J 17/025; B25J 19/063; Y10T 464/20; Y10T 29/49826
USPC .............................. 464/23, 38, 39
See application file for complete search history.

(56) References Cited

U.S. PATENT DOCUMENTS

| 924,749 A | 6/1909 | Drapier | |
|---|---|---|---|
| 1,443,026 A | 1/1923 | Lee | |
| 1,537,629 A * | 5/1925 | Street | B23B 31/38 464/39 |
| 1,953,182 A * | 4/1934 | Lyon | F16D 43/206 464/39 |

(Continued)

FOREIGN PATENT DOCUMENTS

| SU | 425004 A1 * | 4/1974 | ..................... 464/39 |
|---|---|---|---|

*Primary Examiner* — Greg Binda
(74) *Attorney, Agent, or Firm* — Knobbe Martens Olson & Bear LLP (57) ABSTRACT

A compliant safe joint and manufacturing method thereof. The compliant safe joint includes an input axis circumferentially connected to a motor shaft of a DC motor; a movable bridge circumferentially mounted on the input axis and slidable along a axial direction of the input axis; multiple bearings, each of the multiple bearings having an inner ring fixed to the movable bridge and having an outer ring; a stationary bridge rotatably mounted on the movable bridge and having a helicoid surface, the outer ring of each bearing being movable along the helicoid surface; and a flexible component connected to the movable bridge. The stationary bridge rotates about the input axis when a torque which exceeds a predetermined threshold is applied to the stationary bridge by the motor shaft, such that the bearings move with respect to the helicoid surface to cause the flexible component to be compressed and extended through the movable bridge.

12 Claims, 7 Drawing Sheets

(56) References Cited

U.S. PATENT DOCUMENTS

| | | | | |
|---|---|---|---|---|
| 2,291,407 | A | * | 7/1942 | Paul .................... F16D 43/2024 |
| | | | | 464/39 |
| 3,984,997 | A | * | 10/1976 | Dossier ................ F16D 43/211 |
| 4,185,511 | A | * | 1/1980 | Blackburn ............... A23G 9/12 |
| | | | | 464/39 |
| 6,012,985 | A | | 6/2000 | Sukup |
| 6,666,283 | B2 | | 12/2003 | Frauhammer et al. |
| 8,021,071 | B2 | | 9/2011 | Shim et al. |
| 8,235,827 | B2 | | 8/2012 | Shim et al. |
| 9,103,381 | B2 | * | 8/2015 | Arnstein ................ G01P 1/026 |

* cited by examiner

COMPLIANT SAFE JOINT AND MANUFACTURING METHOD THEREOF

RELATED APPLICATIONS

This application claims priority to U.S. Provisional Application No. 62/145,162, filed Apr. 9, 2015, the content of which is incorporated herein by reference.

TECHNICAL FIELD

The present invention relates to a compliant safe joint, and more specifically, to a compliant safe joint used for high gear ratio DC motors to shift from a rigid state into a flexible state during collision.

BACKGROUND

Today, robots have been widely used in various industries. When robots enter into our daily life, special attention must be paid to safety issues related to physical interaction between human and robots. Especially in robotic surgery, where interactions such as physical contacts between surgeons and surgical robots are inevitable, the safety requirements are much stricter. Flexibility or compliance at the joints of the robot can reduce the force acting on human body during collision or contact.

There are mainly two kinds of approaches to produce compliance in a robotic system: (1) active approach, where the compliance is produced from an action of control system rather than from a mechanical structure and (2) passive approach, where the compliance is produced from the mechanical structure rather than the control system. The active compliant approach has high programming ability and precise position accuracy, but it suffers from limitations such as delayed contact response, low reliability, high costs and complex control algorithms. Moreover, the safety cannot be guaranteed when sensors fail to work properly. A passive compliant approach often provides faster and more reliable response to dynamic collision than an active approach. However, a passive compliant system usually has a complex mechanical structure.

US Patent documents U.S. Pat. Nos. 924,749 and 6,666,283 disclose a cam based transmission mechanism that can open when high torque load acting on the coupling. However, the transmission mechanisms have only one effective working direction and only one working state, which is always flexible. US Patent documents U.S. Pat. Nos. 1,443,026 and 6,012,985 disclose another cam based transmission mechanism which have two working states: a rigid one and a free one, and also can work on both directions. However, the mechanism is too complex to implement in compact design. US Patent documents U.S. Pat. No. 8,021,071 and 8,235,827 disclose compliant joint designs for preventing an injury to a human by collision with robot. The designs have multiple working states and are simple enough for real application. However, these designs can only be used in the situation that power plant (motor), compliant joint and working device or end effectors are connected in serial, which leads the result of big volume and makes it difficult in real application.

Therefore, there is a need to provide a compliant safe joint which has small volume and multiple working states, integrates passive and active approaches and hence offers high operational accuracy, reliable intrinsic safety and high bandwidth to the impacts.

SUMMARY OF THE INVENTION

According to an aspect of the present application, a compliant safe joint used for a DC motor is provided. The compliant safe joint may comprise: an input axis circumferentially connected to a motor shaft of the DC motor; a movable bridge circumferentially mounted on the input axis and sliding along a axial direction of the input axis; a plurality of bearings, each of the plurality of bearings having an inner ring and an outer ring, the inner ring being fixed to the movable bridge; a stationary bridge rotatably mounted on the movable bridge and having a helicoid surface, the outer ring of each bearing being movable along the helicoid surface; and a flexible component with an adjustable preload connected to the movable bridge. The stationary bridge rotates about the input axis when a torque which exceeds a predetermined threshold is applied to the stationary bridge by the motor shaft, such that the bearings move with respect to the helicoid surface to cause the flexible component to be compressed and extended through the movable bridge.

According to an aspect of the present application, a method for manufacturing a compliant safe joint is provided. The compliant safe joint may comprise an input axis circumferentially connected to a motor shaft of a DC motor. The method may comprise: mounting circumferentially a movable bridge on the input axis such that the movable bridge is slidable along a axial direction of the input axis; arranging a plurality of bearings on the movable bridge, each of the bearings having an inner ring fixed to the movable bridge and having an outer ring; mounting rotatably a stationary bridge on the movable bridge, the stationary bridge having a helicoid surface, the outer ring of each bearing being movable along the helicoid surface; and connecting a flexible component to the movable bridge; wherein the stationary bridge is rotated about the input axis when a torque which exceeds a predetermined threshold is applied to the stationary bridge by the motor shaft, such that the bearings move with respect to the helicoid surface to cause the flexible component to be compressed and extended through the movable bridge.

According to an embodiment of the present application, the input axis has a plurality of keys for defining a way for the movable bridge to slide along the input axis.

According to an embodiment of the present application, the movable bridge has an inner surface on which at least one slide rail is provided for receiving the keys, such that the movable bridge slides along a line defined by the keys.

According to an embodiment of the present application, the helicoid surface is provided with a plurality of slots, and each of the bearings is constrained in respective slot when the torque applied to the stationary bridge does not exceed the predetermined threshold.

According to an embodiment of the present application, the helicoid surface is provided with one or more protrusions to restrict movement of the outer ring of each bearing.

According to an embodiment of the present application, the helicoid surface has a predetermined slope.

According to an embodiment of the present application, the inner ring of each bearing is fixed to the movable bridge through a screw, one end of the screw is a flat disk whose edge is cut off symmetrically, another end of the screw is provided with screw thread, and middle part of the screw is configured to fit with each bearing.

According to an embodiment of the present application, the helicoid surface is designed to be tangent to the outer ring of each bearing moving along the helicoid surface.

According to an embodiment of the present application, the compliant safe joint may further comprise a ring located between the movable bridge and the stationary bridge and configured to engage the movable bridge and the stationary bridge.

According to an embodiment of the present application, the compliant safe joint may further comprise one or more encoders installed on a head or tail of the compliant safe joint to provide information for controlling a position, velocity or torque of the compliant safe joint.

According to an embodiment of the present application, the compliant safe joint may further comprise an output mechanism connected to the stationary bridge.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations have not been described in detail in order not to unnecessarily obscure the present invention.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this invention belongs.

Figure 1:
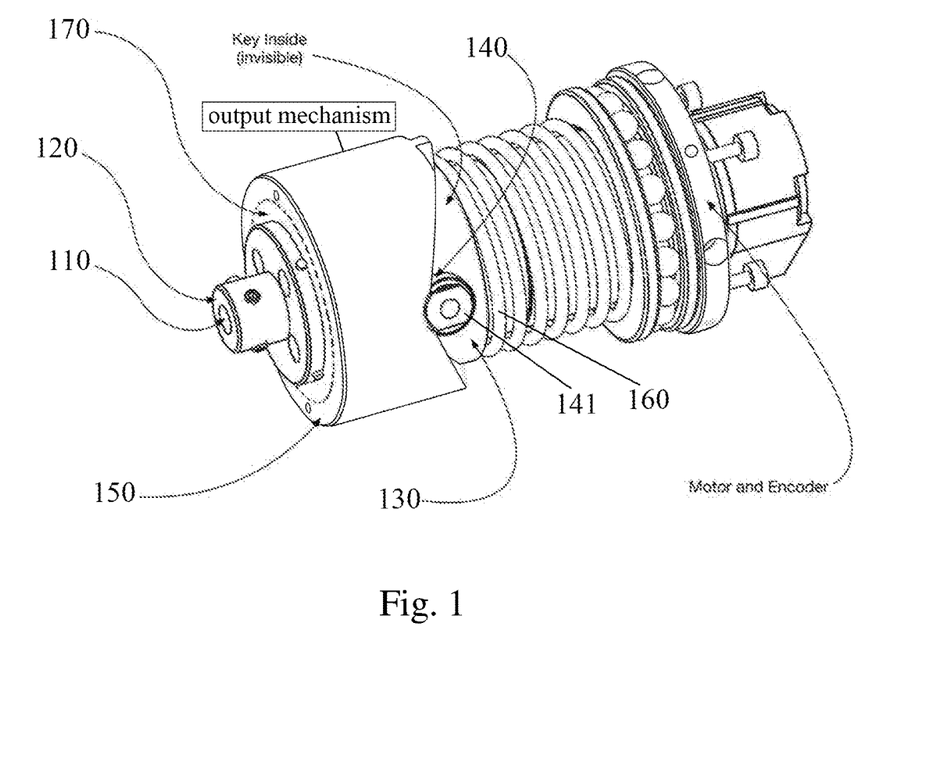
FIG. 1 is a perspective view of a compliant safe joint according to an embodiment of the present application.

FIG. 1 shows a compliant safe joint 100 used for a high gear ratio DC motor according to an embodiment of the present application. As shown in FIG. 1, the compliant safe joint 100 includes an input axis 120 circumferentially connected to a motor shaft 110 of the DC motor and a movable bridge 130 circumferentially mounted on the input axis 120 and slidable along a axial direction of the input axis 120. For example, the motor shaft 110 is an output axis of a standard motor. The input axis 120 is circumferentially fixed on the motor shaft 110 by using a standard component named hexagon socket set screws with a dog point.

Furthermore, the compliant safe joint 100 includes a plurality of bearings 140, each of the plurality of bearings 140 has an inner ring 142 and an outer ring 143, and the inner ring is fixed to the movable bridge 130. A stationary bridge 150 is rotatably mounted on the movable bridge 130. The stationary bridge 150 has a helicoid surface, and the outer ring 143 of each bearing 140 is movable along the helicoid surface. A flexible component 160, for example a spring, is connected to the movable bridge 130. The flexible component 160 is provided with an adjustable preload.

According to an embodiment, the input axis 120 has a plurality of keys for defining a way for the movable bridge 130 to slide along the input axis. The movable bridge 130 has a shape of hollow cylinder and has an inner surface, and at least one slide rail is provided on the inner surface for receiving the keys of the input axis, such that the movable bridge 130 may slide along a line defined by the keys. The key-rail coupling is also used to constrain the rotation of the movable bridge 130 such that the movable bridge 130 can only rotate at the same speed with the input axis 120 and the motor shaft 110.

Referring to FIG. 1 again, the compliant safe joint 100 may further comprise a ring 170, for example a plastic ring. The ring 170 may be located between the movable bridge 130 and the stationary bridge 150 and configured as a bearing to engage the movable bridge 130 and the stationary bridge 150. The ring 170 has a shape of a hollow cylinder and is used as an alternative of bearing due to the tight space left between movable bridge 130 and stationary bridge 150.

In an embodiment, the compliant safe joint 100 may further comprise one or more encoders installed on a head or tail of the compliant safe joint 100 to provide rich information for controlling position, velocity or torque of the compliant safe joint 100 and an output mechanism connected to the stationary bridge 150. For example, a commercial available digital motion controller which requires position information as input is used to control the position, velocity or torque.

Figure 2:
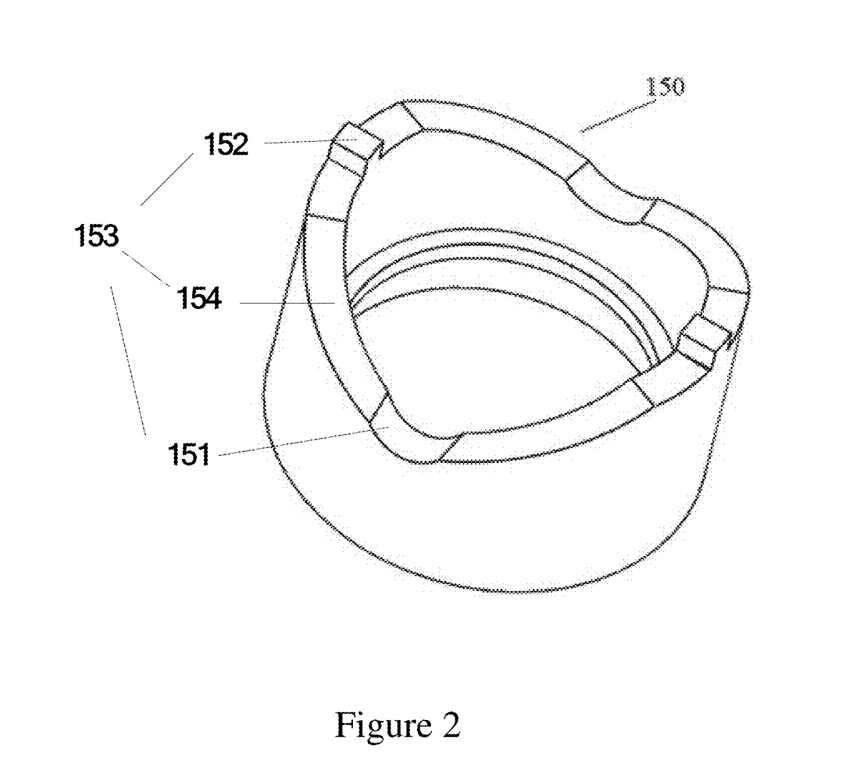
FIG. 2 is a perspective view of a stationary bridge according to an embodiment of the present application.

FIG. 2 is a perspective view of the stationary bridge 150 according to an embodiment of the present application. As shown, the helicoid surface 153 is provided with a plurality of slots 151 for receiving the respective bearing and one or more protrusions 152 to restrict movement of the outer ring of each bearing. The helicoid surface has a predetermined slope 154 and is designed to be tangent to the outer ring of each bearing moving along the helicoid surface.

In an embodiment, the helicoid surface of the stationary bridge 150 may be produced through such a method including the following steps: determining a range of flexibility for the compliant safe joint; determining the slope of helicoid surface; removing material from a hollow cylinder by swept cutting from a rectangular doing helical motion around its central axis, whose parameters are defined according to the previous steps.

Figure 3:
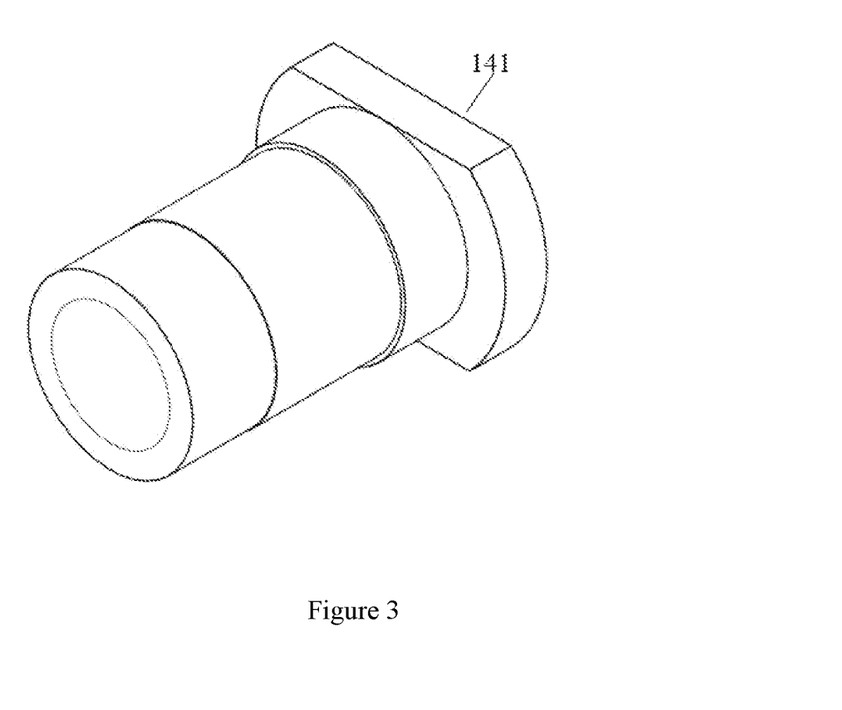
FIG. 3 is a perspective view of a screw according to an embodiment of the present application.

The inner ring of each bearing 140 is fixed to the movable bridge 130 through a screw 141. FIG. 3 is a perspective view of the screw 141 according to an embodiment of the present application. As shown in FIG. 3, one end of the screw 141 is a flat disk whose edge is cut off symmetrically, another end of the screw 141 is provided with screw thread, and middle part of the screw 141 is configured to fit with each bearing. At least one hole is provided on the side surface for mounting screw 141. The hole and the slide rail of the movable bridge 130 are not overlapped In a rigid state, that is, when a torque applied to the stationary bridge 150 does not exceed the predetermined threshold, each of the bearings 140 is constrained in respective slot 151. In a flexible state, that is, when the torque exceeds the predetermined threshold, the stationary bridge 150 rotates about the input axis 120, such that the bearings 140 move out of the respective slot and move along the helicoid surface. Simultaneously, the movable bridge 130 moves in the axial direction and compresses the flexible component accordingly.

In other words, when a working load is below the preset threshold, the compliant safe joint 100 performs as normal rigid motor. When the working load is getting bigger and exceeds the preset threshold, the compliant safe joint 100 shifts from the rigid state into the flexible state so as to work with compliance.

Figure 4:
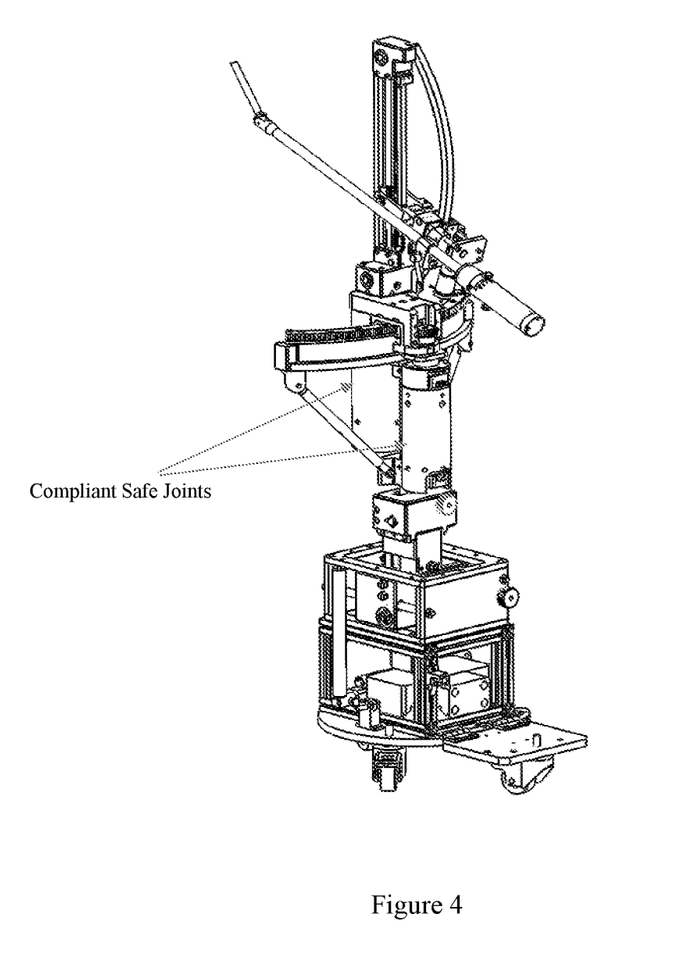
FIG. 4 is a perspective view of an example robot using the compliant safe joint according to an embodiment of the present application.

FIG. 4 is a perspective view of an example robot using the compliant safe joint 100 according to an embodiment of the present application. The application of the compliant safe joint 100 is to actuate a surgical robot for manipulating uterus in totally laparoscopic hysterectomy. Normal motors of a first and second joint of the surgical robot shown in FIG. 4 are replaced with the compliant safe joints 100 of the present application.

The surgical robot has four actuators two of which are the compliant safe joints 100. In this regard, the robot has four degrees of freedom for positioning and deforming the uterus by a uterus manipulator during the surgical procedure. The first two degrees are to change the orientation of the uterus manipulator, the third joint is to control the insertion depth of the robot into the human body, and the fourth one is for tilt up and down the tip of the uterus manipulator. The uterus robot has a remote center of motion to restrain the motion of the uterus manipulator.

The compliant safe joint of the present application can work on axial and circumferential directions, has multiple working states, has small volume and is very easy to adjust the stiffness of the flexible working state. In order to have compact design, every component is designed to have a circular shape so that those components can be put backward around a motor. The compliant safe joint of the present application is specially designed for high gear ratio DC motors so that it can be used to actuate robot without too much or even on modification of the robot.

Figure 5:
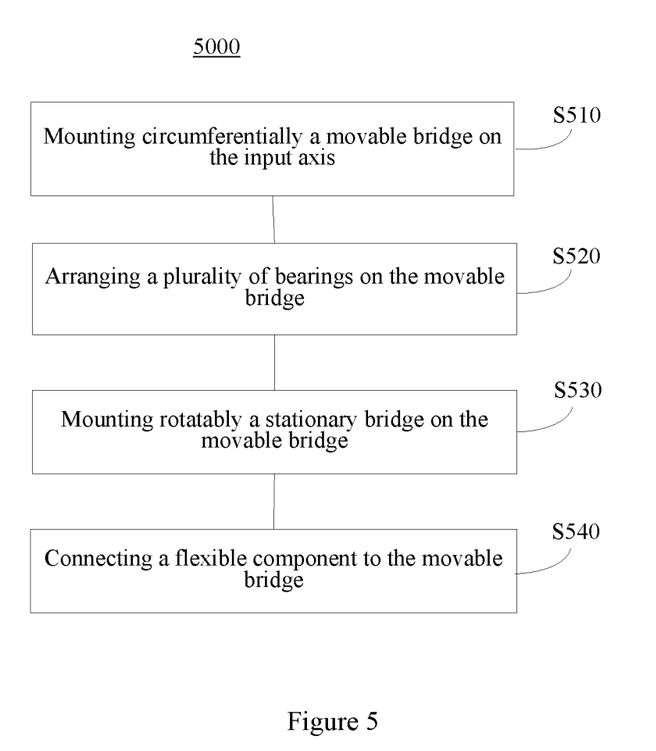
FIG. 5 is a flow chart of a method for manufacturing a compliant safe joint according to an embodiment of the present application.

FIG. 5 is a flow chart of a method 5000 for manufacturing a compliant safe joint according to an embodiment of the present application. The compliant safe joint comprises an input axis circumferentially connected to a motor shaft of a DC motor. A plurality of keys are formed on the input axis to define a way for a movable bridge to slide along the input axis. For example, the motor shaft is an output axis of a standard motor. The input axis is circumferentially fixed on the motor shaft by using a standard component named hexagon socket set screws with a dog point.

As shown in FIG. 5, in the step S510, a movable bridge is mounted circumferentially on the input axis such that the movable bridge is slidable along an axial direction of the input axis. The movable bridge has a shape of hollow cylinder and has an inner surface. At least one slide rail are formed on an inner surface of the movable bridge for receiving the keys, such that the movable bridge slides along the line defined by the keys. The key-rail coupling is also used to constrain the rotation of the movable bridge such that the movable bridge can only rotate at the same speed with the input axis and the motor shaft.

In the step S520, a plurality of bearings on are arranged on the movable bridge, each of the bearings has an inner ring fixed to the movable bridge and has an outer ring. The inner ring of each bearing is fixed to the movable bridge through a screw. In an embodiment, one end of the screw is a flat disk whose edge is cut off symmetrically, another end of the screw is provided with screw thread, and middle part of the screw is configured to fit with each bearing In the step S530, a stationary bridge is mounted rotatably on the movable bridge, wherein the stationary bridge has a helicoid surface, and the outer ring of each bearing is movable along the helicoid surface. The helicoid surface has a predetermined slope. Furthermore, the helicoid surface may be designed to be tangent to the outer ring of each bearing moving along the helicoid surface A plurality of slots are formed on the helicoid surface, wherein each of the bearings is constrained in respective slot when the torque applied to the stationary bridge does not exceed the predetermined threshold. In an embodiment, one or more protrusions are formed on the helicoid surface to restrict movement of the outer ring of each bearing. Furthermore, an output mechanism may be connected to the stationary bridge.

In the step S540, a flexible component, for example, a spring, is connected to the movable bridge. The stationary bridge is rotated about the input axis when a torque which exceeds a predetermined threshold is applied to the stationary bridge by the motor shaft, such that the bearings move with respect to the helicoid surface to cause the flexible component to be compressed and extended through the movable bridge.

Figure 6:
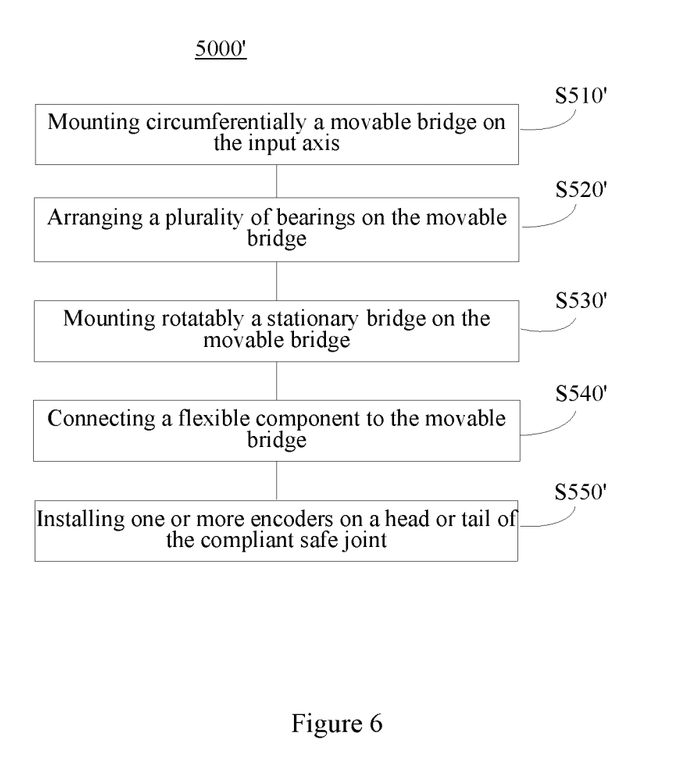
FIG. 6 is a flow chart of a method for manufacturing a compliant safe joint according to another embodiment of the present application.
Figure 7:
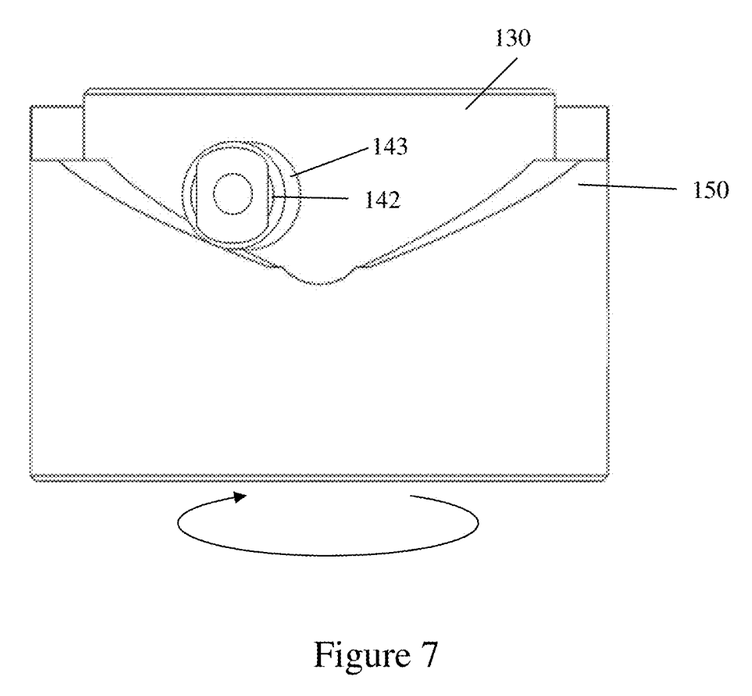
FIG. 7 is a front view illustration a flexible state of the compliant state joint according to an embodiment of the present application, in which a bearing moves out of a slot.

FIG. 6 is a flow chart of a method 5000' for manufacturing a compliant safe joint according to another embodiment of the present application. The method 5000' shown in FIG. 6 is similar to the method 5000 shown in FIG. 5 except for the step S550'. Therefore, the description for the steps S510' to S540' is omitted here for clarity. In the step S550', one or more encoders are installed on a head or tail of the compliant safe joint to provide information for controlling the compliant safe joint.

In an embodiment, a ring, for example a plastic ring may be located between the movable bridge and the stationary bridge and configured as a bearing to engage the movable bridge and the stationary bridge. The ring has a shape of a hollow cylinder and is used as an alternative of bearing due to the tight space left between movable bridge and stationary bridge.

The present invention has been described with regard to one or more embodiments. However, it will be apparent to persons skilled in the art that a number of variations and modifications can be made without departing from the scope of the invention as defined in the claims.

What is claimed is:

1. A compliant safe joint, comprising:
   an input axis circumferentially connected to a motor shaft of a DC motor, wherein the motor shaft is arranged in a hole in a center of the input axis;
   a movable bridge circumferentially mounted on the input axis and slidable along an axial direction of the input axis;
   a plurality of bearings, each of the bearings having an inner portion fixed to the movable bridge and having an outer portion;

a stationary bridge rotatably mounted on the movable bridge and having a helicoid surface, the outer portion of each bearing being movable along the helicoid surface, wherein the helicoid surface is provided with a plurality of slots, and each of the bearings is constrained in a respective slot when the torque applied to the stationary bridge does not exceed the predetermined threshold, the helicoid surface having a predetermined slope tangent to the outer portion of the bearing when the outer portion of the bearing moves along the helicoid surface and non-tangent to the outer portion of the bearing when the outer portion of the bearing is constrained in the slot; and a flexible component connected to the movable bridge;

wherein the stationary bridge rotates about the input axis when a torque which exceeds a predetermined threshold is applied to the stationary bridge by the motor shaft, such that the bearings move with respect to the helicoid surface to cause the flexible component to be compressed and extended through the movable bridge.

2. The compliant safe joint according to claim 1, wherein the helicoid surface is provided with one or more protrusions to restrict movement of the outer ring of each bearing.

3. The compliant safe joint according to claim 1, wherein the inner ring of each bearing is fixed to the movable bridge through a screw, and one end of the screw is a flat disk whose edge is cut off symmetrically.

4. The compliant safe joint according to claim 1, further comprising a ring located between the movable bridge and the stationary bridge and configured to engage the movable bridge and the stationary bridge.

5. The compliant safe joint according to claim 1, further comprising one or more encoders installed on a head or tail of the compliant safe joint to provide information for controlling a position, velocity or torque of the compliant safe joint.

6. The compliant safe joint according to claim 1, further comprising an output mechanism connected to the stationary bridge.

7. A method for manufacturing a compliant safe joint, the compliant safe joint comprising an input axis circumferentially connected to a motor shaft of a DC motor; and the method comprising:

circumferentially mounting a movable bridge on the input axis such that the movable bridge is slidable along an axial direction of the input axis, wherein the motor shaft is arranged in a hole in a center of the input axis;

arranging a plurality of bearings on the movable bridge, each of the bearings having an inner ring fixed to the movable bridge and having an outer portion;

mounting rotatably a stationary bridge on the movable bridge, the stationary bridge having a helicoid surface, the outer portion of each bearing being movable along the helicoid surface, wherein the helicoid surface is provided with a plurality of slots, and each of the bearings is constrained in respective slot when the torque applied to the stationary bridge does not exceed the predetermined threshold, the helicoid surface having a predetermined slope tangent to the outer portion of the bearing when the outer portion of the bearing moves along the helicoid surface and non-tangent to the outer portion of the bearing when the outer portion of the bearing is constrained in the slot; and connecting a flexible component to the movable bridge;

wherein the stationary bridge is rotated about the input axis when a torque which exceeds a predetermined threshold is applied to the stationary bridge by the motor shaft, such that the bearings move with respect to the helicoid surface to cause the flexible component to be compressed and extended through the movable bridge.

8. The method according to claim 7, wherein the mounting rotatably a stationary bridge on the movable bridge further comprises forming one or more protrusions on the helicoid surface to restrict movement of the outer ring of each bearing.

9. The method according to claim 7, wherein the arranging a plurality of bearings on the movable bridge further comprises fixing the inner ring of each bearing to the movable bridge through a screw, and one end of the screw is a flat disk whose edge is cut off symmetrically.

10. The method according to claim 7, further comprising locating a ring between the movable bridge and the stationary bridge and engaging the movable bridge and the stationary bridge through the ring.

11. The method according to claim 7, further comprising installing one or more encoders on a head or tail of the compliant safe joint to provide information for controlling a position, velocity or torque of the compliant safe joint.

12. The method according to claim 7, further comprising connecting an output mechanism to the stationary bridge.

* * * * *